United States Patent
Jung et al.

(10) Patent No.: US 11,804,732 B2
(45) Date of Patent: Oct. 31, 2023

(54) WIRELESS POWER TRANSMISSION DEVICE, AND TRANSMISSION POWER CONTROL METHOD THEREFOR

(71) Applicant: GE HYBRID TECHNOLOGIES, LLC, Niskayuna, NY (US)

(72) Inventors: Chun Kil Jung, Seoul (KR); Sang Youn Noh, Suwon-si (KR); Hak Do Kim, Suwon-si (KR)

(73) Assignee: GE Hybrid Technologies, LLC, Niskayuna, NY (US)

(*) Notice: Subject to any disclaimer, the term of this patent is extended or adjusted under 35 U.S.C. 154(b) by 475 days.

(21) Appl. No.: 15/544,882

(22) PCT Filed: Jan. 20, 2016

(86) PCT No.: PCT/KR2016/000587
§ 371 (c)(1),
(2) Date: Nov. 21, 2017

(87) PCT Pub. No.: WO2016/117927
PCT Pub. Date: Jul. 28, 2016

(65) Prior Publication Data
US 2018/0212467 A1    Jul. 26, 2018

Related U.S. Application Data

(60) Provisional application No. 62/105,664, filed on Jan. 20, 2015.

(51) Int. Cl.
*H02J 50/12* (2016.01)
*H02J 50/40* (2016.01)
*H02J 7/34* (2006.01)

(52) U.S. Cl.
CPC .............. *H02J 50/12* (2016.02); *H02J 7/342* (2020.01); *H02J 50/40* (2016.02)

(58) Field of Classification Search
CPC .. H02J 50/12; H02J 7/025; H02J 50/40; H02J 7/0054
(Continued)

(56) References Cited

U.S. PATENT DOCUMENTS

2009/0015210 A1* 1/2009 Kojima ............... B60L 3/04
320/163
2009/0174263 A1* 7/2009 Baarman .............. H02J 50/40
307/104
(Continued)

FOREIGN PATENT DOCUMENTS

KR    1020140007273 A    1/2014
KR     20140071047 A    6/2014
(Continued)

OTHER PUBLICATIONS

"PCT Application No. PCT/KR2016/000587 International Preliminary Reporton Patentability", dated Aug. 3, 2017, 10 pages.
(Continued)

*Primary Examiner* — Rexford N Barnie
*Assistant Examiner* — Thai H Tran
(74) *Attorney, Agent, or Firm* — DELIZIO, PEACOCK, LEWIN & GUERRA; John F. Guerra

(57) ABSTRACT

A wireless power transmission device, and a transmission power control method therefor are provided. A wireless power transmission device for wirelessly transmitting power to a wireless power receiving device can comprise: a primary core comprising at least one primary coil and transmitting a power signal to the wireless power receiving device by being coupled, through magnetic induction or magnetic resonance, to a secondary core provided at the wireless power receiving device; an inverter connected to the primary core so as to apply an alternating voltage necessary for transmitting the power signal; and a controller
(Continued)

connected to the inverter, and controlling a direct voltage to be applied to the wireless power transmission device and/or a gate voltage of the inverter on the basis of the information on the power received at the wireless power receiving device by the power signal.

14 Claims, 8 Drawing Sheets

(58) Field of Classification Search
USPC .......................................... 307/104; 320/108
See application file for complete search history.

(56) References Cited

U.S. PATENT DOCUMENTS

| | | | | |
|---|---|---|---|---|
| 2011/0291614 | A1* | 12/2011 | Yeh | ............... B60R 11/02 320/108 |
| 2012/0021054 | A1 | 1/2012 | Lum et al. | |
| 2012/0201054 | A1 | 8/2012 | Kitamura et al. | |
| 2012/0306285 | A1* | 12/2012 | Kim | ............... H02J 50/80 307/104 |
| 2013/0026847 | A1* | 1/2013 | Kim | ............... B60L 53/36 307/104 |
| 2013/0285618 | A1* | 10/2013 | Iijima | ............... H02J 50/10 320/137 |
| 2014/0009109 | A1 | 1/2014 | Lee et al. | |
| 2014/0152247 | A1 | 6/2014 | Kim et al. | |
| 2014/0265615 | A1 | 9/2014 | Kim et al. | |
| 2015/0326061 | A1* | 11/2015 | Davison | ............... H02J 7/0044 320/108 |
| 2015/0357863 | A1* | 12/2015 | Sadakata | ............... H02J 5/005 320/108 |

FOREIGN PATENT DOCUMENTS

| | | |
|---|---|---|
| KR | 1020140114924 A | 9/2014 |
| WO | 2013112614 A1 | 8/2013 |
| WO | 2016117927 | 7/2016 |

OTHER PUBLICATIONS

"PCT Application No. PCT/KR2016/000587 International Search Report and Written Opinion", dated Apr. 18, 2016, 10 pages.

"Qi System Description Wireless Power Transfer", Wireless Power Consortium, vol. 1:Low Power, Part 1:Interface Definition, Version 1.0.1, Oct. 2010, 88 pages.

* cited by examiner

WIRELESS POWER TRANSMISSION DEVICE, AND TRANSMISSION POWER CONTROL METHOD THEREFOR

CROSS-REFERENCE TO RELATED APPLICATIONS

This application is a national stage of International Application No. PCT/KR2016/000587, filed Jan. 20, 2016, which claims the benefit of priority to U.S. Provisional Application No. 62/105,664, filed Jan. 20, 2015, the disclosures of which are incorporated herein by reference.

BACKGROUND OF THE INVENTION

Field of the Invention

The present invention relates to a contactless charging system and, more particularly, to a wireless power transmission apparatus for transmitting wireless power to a wireless power reception apparatus and a transmission power control method therefor.

Related Art

Recently, portable electronic devices such as a smart phone, a laptop, an MPEG-1 Audio Layer-3 (MP3) player, and a headset are spreading. However, since the portable electronic devices operate by consuming electric power stored in a battery cell (e.g., a primary battery, a secondary battery, etc.), it is necessary to charge or replace the battery cells of portable electronic devices in order to allow the portable electronic devices to continuously operate.

Methods of charging battery cells are roughly divided into a contact charging method of performing charging using a power supply line and a power supply terminal and a contactless charging method of performing charging by receiving wireless power induced by a magnetic field generated in a primary coil of a wireless power transmission apparatus through a wireless power reception apparatus. However, in the contact charging method, when a charger and a battery are coupled to or separated from each other, an instantaneous discharge phenomenon occurs due to a potential difference at both terminals, and since a power supply terminal is exposed to the outside, foreign substances may be piled on the power supply terminal, thereby causing a fire. In addition, there are limitations in that the battery is naturally discharged due to moisture, and the lifetime and performance of the battery are reduced. Accordingly, in recent years, the contactless charging method is being actively studied to solve the above-mentioned limitations.

One of the technologies related to the contactless charging method is disclosed in Korean Patent Application Publication No. 10-2014-0107306 (published on Sep. 4, 2014), entitled "wireless power transmission apparatus and wireless power signal transmission control method in wireless power transmission apparatus", where the wireless power transmission apparatus receives a wireless power reception signal from a wireless power reception apparatus through a transmission coil, and when there is a normal signal in a AC current signal, an AC voltage signal of the transmission coil according to the wireless power reception signal, and a DC current signal of a driver, processes the normal signal to acquire wireless power reception information included in the wireless power reception signal and control the wireless power signal based on the wireless power reception information.

As shown in FIG. 1, the wireless power transmission apparatus generally includes a Main Control Unit (MCU; 110), a DC-DC converter (120), an inverter (130), and a primary coil (140). The MCU (110) controls the output of the DC-DC converter (120) according to the required power of the wireless power reception apparatus. The DC-DC converter (120) converts a DC voltage (Vin) inputted into the wireless power transmission apparatus according to the control of the MCU (110). The inverter (130) converts a Direct Current (DC) voltage outputted from the DC-DC converter (120) into an Alternating Current (AC) voltage. The primary coil (140) transmits the AC voltage outputted from the inverter (130) to a secondary coil of the wireless power reception apparatus. In FIG. 1, a full bridge inverter is illustrated as being used as the inverter (130). In FIG. 1, Lp represents an inductance of the primary coil (140), and Cp represents a capacitance of a capacitor.

However, when the output of the DC-DC converter (120) is varied in order to control the transmission power by the wireless power reception apparatus, that is, to control the output of the inverter (130), there are limitations in that the system efficiency is reduced due to the change of the output of the wireless power transmission apparatus, heat is generated by the use of the DC-DC converter (120), the cost increases due to the presence of the DC-DC converter (120), and the additional use of a power coil is needed.

SUMMARY OF THE INVENTION

The present invention provides a wireless power transmission apparatus and a power transmission control method capable of maintaining optimum efficiency regardless of the position of the wireless power reception apparatus, temperature, and power level without changing the system output.

The present invention also provides a wireless power transmission apparatus and a transmission power control method capable of reducing the manufacturing cost and heating.

In an aspect, a wireless power transmission apparatus for wirelessly transmitting power to a wireless power reception apparatus is provided. The wireless power transmission apparatus includes: a primary core including at least one primary coil transmitting a power signal to the wireless power reception apparatus by coupling to a secondary core comprised in the wireless power reception apparatus by magnetic induction or magnetic resonance; an inverter connected to the primary core and applying an AC voltage necessary to transmit the power signal; and a controller connected to the inverter and controlling at least one of a Direct Current (DC) voltage applied to the wireless power transmission apparatus and a gate voltage of the inverter based on information about power received at the wireless power reception apparatus by the power signal.

The information about the power received at the wireless power reception apparatus may be received from the wireless power reception apparatus while the power signal is being transmitted at the primary core.

The controller may calculate a power transmission efficiency based on the information about the power received at the wireless power reception apparatus and may adjust at least one of the DC voltage and the gate voltage such that the power transmission efficiency is maintained at a maximum.

The controller may calculate the power transmission efficiency based on the information on the power received at the wireless power reception apparatus and an input power of the wireless power transmission apparatus.

The controller may compare a power transmission efficiency of a current cycle with a power transmission efficiency of a previous cycle to maintain the power transmission efficiency at the maximum, and may compare a transmission power of the current cycle with a transmission power of the previous cycle to maintain an output of the wireless power transmission apparatus uniform.

The controller may control the DC voltage applied to the wireless power transmission apparatus by controlling a boost-up or boost-down of a converter included in the wireless power transmission apparatus.

The inverter may be a half bridge inverter or a full bridge inverter including at least two transistors.

The transistor may be an N-Channel or P-channel Metal Oxide Silicon Field Effect Transistor (MOSFET).

The controller may control a gate voltage of the transistor to increase or decrease until the power transmission efficiency becomes maximum.

When receiving, from the wireless power reception apparatus, a difference value between a required power of the wireless power reception apparatus and the power received from the wireless power transmission apparatus while the power signal is being transmitted at the primary core, the controller may adjust the output of the wireless power transmission apparatus by controlling at least one of the DC voltage and the gate voltage in accordance with the difference value.

In another aspect, a method of controlling transmission power by a wireless power transmission apparatus is provided. The method includes: transmitting a power signal to a wireless power reception apparatus using a primary coil included in the wireless power transmission apparatus; receiving a received power packet including information about power received by the wireless power reception apparatus from the wireless power reception apparatus; and controlling at least one of a Direct Current (DC) voltage applied to the wireless power transmission apparatus and a gate voltage of an inverter included in the wireless power transmission apparatus based on the information about the power received by the wireless power reception apparatus.

In still another aspect, a method of controlling transmission power by a wireless power transmission apparatus is provided. The method includes: transmitting a power signal to a wireless power reception apparatus using a primary coil included in the wireless power transmission apparatus; receiving, from the wireless power reception apparatus, a control error packet including a difference value between a power required by the wireless power reception apparatus and a power received from the wireless power transmission apparatus; and controlling at least one of a Direct Current (DC) voltage applied to the wireless power transmission apparatus and a gate voltage of an inverter included in the wireless power transmission apparatus according to the difference value.

The optimal power transmission efficiency can be maintained regardless of the position with respect to a wireless power reception apparatus, temperature, power level, and the like without changing the output of the wireless power transmission apparatus by controlling a DC voltage applied to a wireless power transmission apparatus or a gate bias of an inverter instead of controlling the output of a converter during transmission power control.

Since the DC-DC converter can be excluded from the wireless power transmission apparatus, the cost and heating due to the use of the DC-DC converter can be reduced.

DESCRIPTION OF EXEMPLARY EMBODIMENTS

Figure 1:
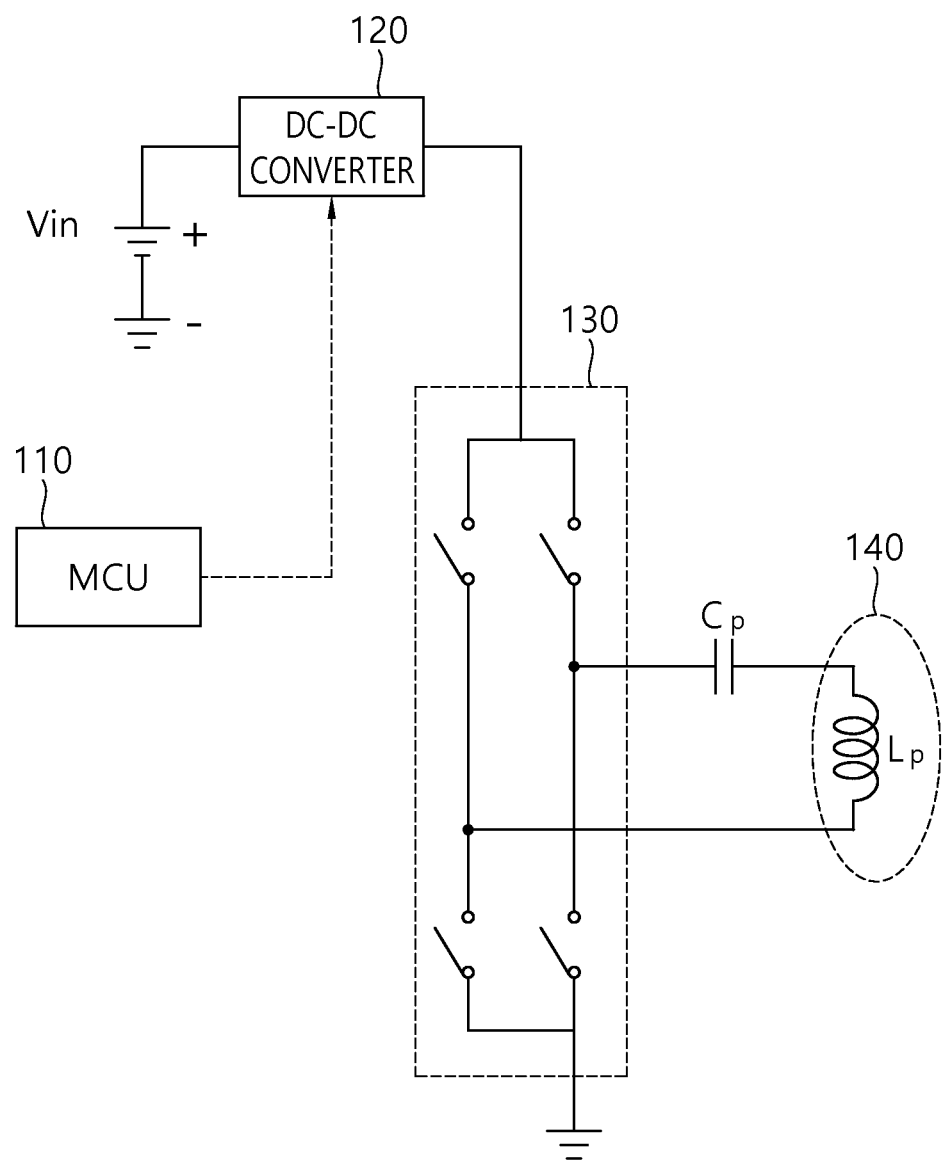
FIG. 1 is a view illustrating a structure of a typical wireless power transmission apparatus.

Hereinafter, exemplary embodiments of the present invention will be described in detail with reference to the accompanying drawings so that those skilled in the art can easily carry out the present invention. However, the present invention can be implemented in various types, and is not limited to the embodiments set forth herein. Also, parts irrelevant to the description of the present invention will be omitted for clarification of description, and like parts are indicated as like reference numerals throughout the specification.

When it is described throughout the specification that one comprises (or includes or has) some elements, it should be understood that it may comprise (or include or has) only those elements, or it may comprise (or include or have) other elements as well as those elements if there is no specific limitation.

The term 'wireless power' used herein means any type of energy associated with an electric field, a magnetic field, and an electromagnetic field transmitted from a transmitter to a receiver without the use of physical electromagnetic conductors. The wireless power may also be referred to as a power signal or a wireless energy, and may also denote an oscillating magnetic flux enclosed by a primary coil at a transmission side and a secondary coil at a reception side. Hereinafter, transmission power control in a contactless charging system for wirelessly charging devices including a mobile phone, a cordless telephone, a smart phone, an MP3 player, a laptop, a headset, etc. will be illustrated. The basic principles of wireless power transmission include both magnetic induction method and magnetic resonance coupling (resonance induction) method that uses frequencies of less than 30 MHz. However, various frequencies at which license-exempt operations at relatively high radiation levels, for example, less than 135 kHz (LF) or at 13.56 MHz (HF) are allowed may be used.

Figure 2:
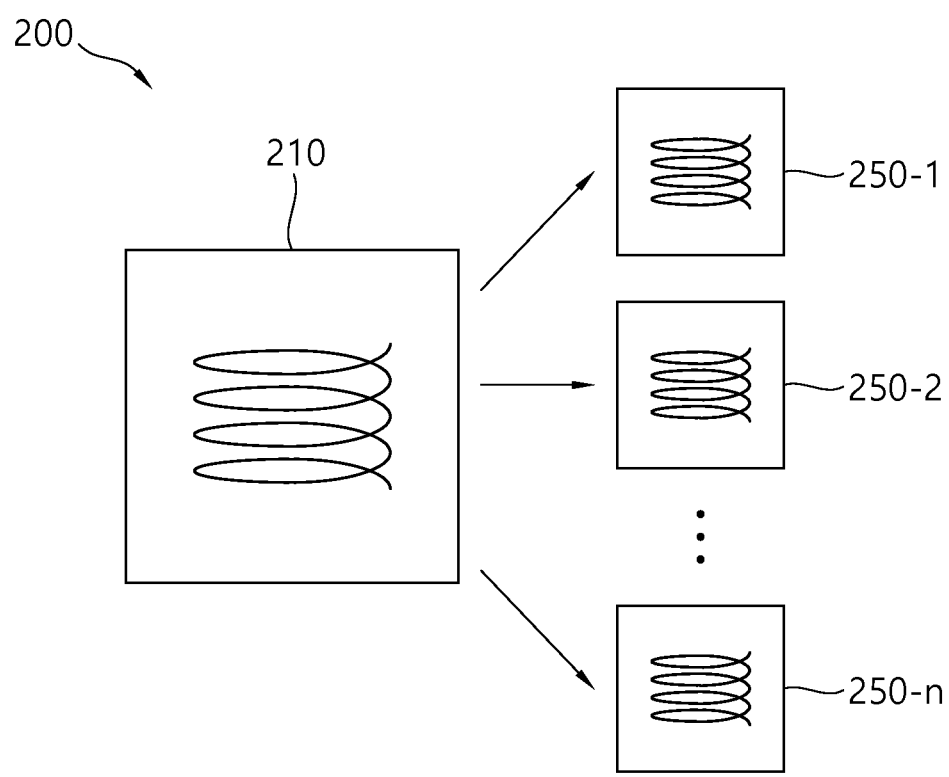
FIG. 2 is a view illustrating a contactless charging system according to an embodiment of the present invention.

FIG. 2 is a view illustrating a contactless charging system according to an embodiment of the present invention.

Referring to FIG. 2, a contactless charging system 200 includes a wireless power transmission apparatus 210 and at least one wireless power reception apparatus 250-1 to 250-*n* (here, n is a natural number).

The wireless power transmission apparatus 210 includes a primary core. The primary core may include at least one primary coil and at least one capacitor coupled to the at least one primary coil. The wireless power transmission apparatus 210 may have any suitable form, but one preferred form is a flat platform with a power transfer surface. Each of the wireless power reception apparatuses 250-1 through 250-n may be located over or near the platform to receive wireless power from the wireless power transmission apparatus 210.

Each of the wireless power reception apparatuses 250-1 to 250-n is detachable from the wireless power transmission apparatus 210. Each of the wireless power reception apparatuses 250-1 to 250-n includes a secondary core coupled to an electromagnetic field generated by the primary core of the wireless power transmission apparatus 210 when being close to the wireless power transmission apparatus 210. The secondary core may include at least one secondary coil and at least one capacitor coupled to the at least one secondary coil.

The wireless power transmission apparatus 210 may transmit power to each of the wireless power reception apparatuses 250-1 to 250-n without a direct electrical contact (e.g., cord contact) with the wireless power reception apparatuses 250-1 to 250-n. In this case, the primary core and the secondary core are coupled to each other by a magnetic induction method or a magnetic resonance method. The primary coil or the secondary coil may have any suitable form. In one embodiment, the primary and secondary coils may be a copper wire wound around a formation with a high magnetic permeability, such as ferrite or amorphous material.

Each of the wireless power reception apparatuses 250-1 to 250-n may be connected to an external load (not shown, also referred to as an actual load of the wireless power reception apparatus), and may supply power wirelessly received from the wireless power transmission apparatus 210 to the external load. For example, the wireless power reception apparatuses 250-1 to 250-n may each carry power received from the wireless power transmission apparatus 210 to an object that consumes or stores power, such as a portable electric/electronic device, or a rechargeable battery cell or battery.

Figure 3:
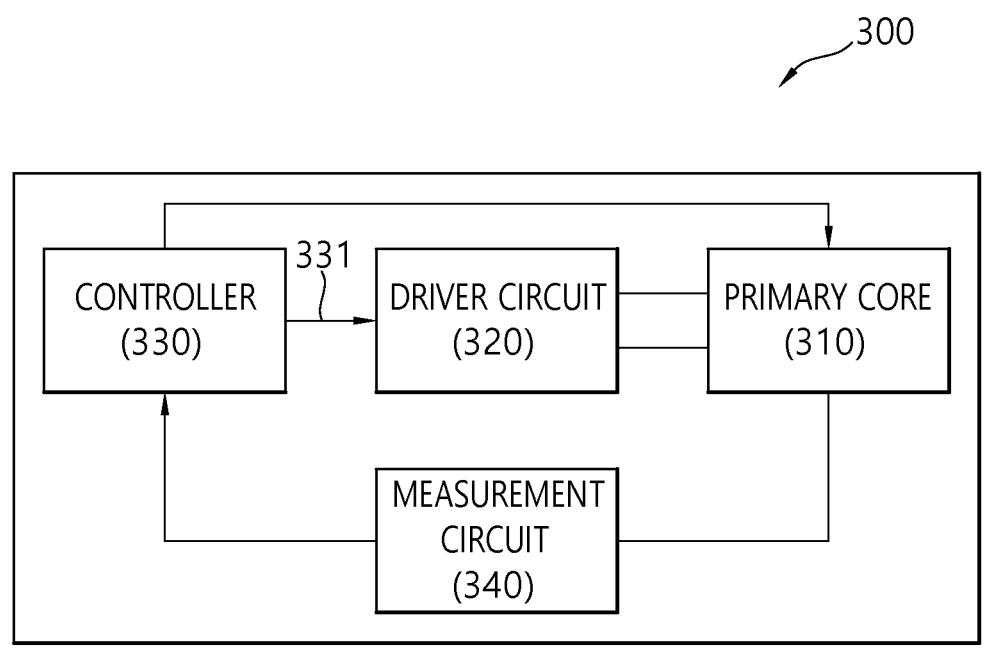
FIG. 3 is a view illustrating a wireless power transmission apparatus according to an embodiment of the present invention.

FIG. 3 is a view illustrating a wireless power transmission apparatus according to an embodiment of the present invention.

Hereinafter, the wireless power transmission apparatus will be described in more detail with reference to FIG. 3.

A wireless power transmission apparatus 300 includes a primary core 310, a driver circuit 320, a controller 330, and a measurement circuit 340.

The primary core 310 includes at least one primary coil coupled to a secondary core provided in the wireless power reception apparatus by magnetic induction or magnetic resonance to transmit a signal for detecting the wireless power reception apparatus, a wireless power signal, etc. For example, the primary core 310 may include at least one primary resonant coil and at least one primary inductive coil. Thus, the resonant coil and the inductive coil may be included in a single core or a single wireless power transmission apparatus as a single module, which can be called a hybrid type. In the hybrid type, the primary resonant coil is a coil used to transmit wireless power to the wireless power reception apparatus by magnetic resonance coupling, and the primary inductive coil is a coil used to transmit wireless power to the wireless power reception apparatus by magnetic induction coupling. In this case, the primary core 310 may include a capacitor coupled to the primary resonant coil so as to form a magnetic resonance with the primary resonant coil. The magnetic induction method may be used to supply or transmit the corresponding power when the primary core 310 transmits wireless power by the magnetic resonance method. Accordingly, the primary inductive coil may be referred to as a drive coil.

The driver circuit 320 is connected to the primary core 310 to apply electric driving signals to the primary core 310 such that an electromagnetic field is generated in the primary core 310. The driver circuit 320 may include a converter that converts a Direct Current (DC) voltage (power) inputted into the wireless power transmission apparatus 300 and an inverter that converts a DC voltage outputted from the converter into an AC voltage. Here, the converter may be a DC-DC converter having a boost-up function and a boost-down function, but may not be included in the wireless power transmission apparatus 300 according to the structure of the wireless power transmission apparatus 300. That is, according to an embodiment of the present invention, the converter may be excluded from the wireless power transmission apparatus 300. The inverter may be connected to the primary coil to apply an AC voltage, which is needed to transmit a power signal and a signal for detecting the wireless power reception apparatus to the wireless power reception apparatus, to the primary core 310. In one embodiment, the inverter may be a half-bridge inverter or a full-bridge inverter including at least two transistors, and the transistor may be an N-channel or P-channel Field Effect Transistor (FET) or a Metal Oxide Silicon (MOS) FET.

The controller 330 is connected to the driver circuit 320, and generates a control signal 331 for controlling an Alternating Current (AC) signal needed when the primary core 310 generates an induction magnetic field or incurs a magnetic resonance. The controller 330, as a sort of processor, may include Application-Specific Integrated Circuits (ASICs), other chip sets, logic circuits and/or data processing devices, and may control the operating frequency, voltage, current, and/or duty cycle of the wireless power transmission apparatus 300 based on information received from the wireless power reception apparatus.

Also, the controller 330 may be connected to the primary core 310 to provide a control signal for controlling a switch of the primary core 310. For example, when the primary coil included in the primary core 310 is a hybrid type, the controller 330 may perform an operation for driving a hybrid type of coil. For this, the controller 330 may check whether or not the wireless power reception apparatus is a magnetic resonance-based wireless power reception apparatus. That is, the controller 330 may check whether or not the wireless power reception apparatus is a resonance type. If the wireless power reception apparatus is a resonance type, the controller 330 may apply a control signal for turning on the switch to the primary core 310 such that wireless power is transmitted by a magnetic resonance method. On the other hand, if the wireless power reception apparatus is an induction type, the controller 330 may apply a control signal for turning off the switch to the primary core 310 such that wireless power is transmitted by a magnetic resonance method.

The measurement circuit 340 measures a current or a voltage flowing in the primary core 310. For this, the measurement circuit 340 may be implemented with a current sensor or a voltage sensor. Alternatively, the measurement circuit 340 may lower a high current flowing in the primary core 310 to a low current for use, or may be a transformer that lowers a high voltage applied to the primary coil to a low voltage.

Although not shown in the drawings, the wireless power transmission apparatus 300 may include at least one of a storage device and a communication module wirelessly exchanging data with the wireless power reception apparatus. The communication module may include a Radio Frequency (RF) antenna for transmitting or receiving a signal and a circuit for processing a wireless signal. The storage device may include disk drives, Read-Only Memories (ROMs), Random Access Memories (RAMs), flash memories, memory cards, storage media and the like.

The controller 330 may acquire information transmitted by the wireless power reception apparatus using a current or voltage value measured in the measurement circuit 340. The wireless power reception apparatus may periodically or non-periodically transmit, to the power transmission apparatus 300, a power control signal requesting a power increase or requesting a power decrease until required power is satisfied, by varying a load while receiving power from the wireless power transmission apparatus. The power control signal may be called a control error message or a control error packet in that the power control signal includes information on a difference between the required power of the wireless power reception apparatus and the transmission power of the wireless power transmission apparatus 300.

When the wireless power transmission apparatus 300 receives a power control signal requesting a power increase from the wireless power reception apparatus through a load variation, the wireless power transmission apparatus 300 may lower the power control signal to an appropriate level through a voltage divider using a transformer or a resistor, may perform envelope detection using a detector, and then may allow the power control signal to pass through a low-pass filter, thereby detecting a signal from the wireless power reception apparatus. Also, the wireless power transmission apparatus 300 may increase the intensity of the current flowing in the primary core 310 such that higher power is transmitted as a response to the power control signal. More specifically, in order to allow a larger current to flow in the primary core 310, the controller 330 may control a control signal 331 such that an AC signal larger than a reference AC signal can be applied to the primary core 310. On the contrary, when the controller 330 receives a power control signal requesting the power decrease from the wireless power reception apparatus, the controller 330 may control the control signal 331 such that an AC signal lower than the reference AC signal is applied to the primary core 310 such that power lower than the current transmission power is transmitted.

Meanwhile, the controller 330 may acquire information about power received from the wireless power reception apparatus, information about the charging state and the like using the measurement circuit 340, the communication module and the like during the wireless power transmission, that is, while the power signal is being transmitted in the primary core 310. Here, a signal including the information about the power received by the wireless power reception apparatus may be referred to as a received power packet, and a signal including the information about the charging state may be referred to as a charge status packet.

When receiving the information on the power received in the wireless power reception apparatus from the wireless power reception apparatus, the controller 330 may calculate the power transmission efficiency based on the received information, and may control a DC voltage applied to the converter included in the driver circuit 320 and/or a gate voltage of the inverter included in the driver circuit 320 such that the calculated power transmission efficiency is maintained at the maximum. The wireless power transmission apparatus may recognize whether or not the wireless power reception apparatus is moved, based on the power information received from the wireless power reception apparatus. For example, the controller 330 may calculate the power transmission efficiency (system efficiency) based on information about the power inputted into the wireless power transmission apparatus and information (reception power information) about the power received from the wireless power reception apparatus. Also, the controller 330 may compare the power transmission efficiency of the current cycle with the power transmission efficiency of the previous cycle to control the power transmission efficiency to be maintained at the maximum, and may compare the transmission power of the current cycle with the transmission power of the previous cycle to control the output of the wireless power transmission apparatus to remain uniform.

When the DC voltage that is applied to the converter included in the driver circuit 320 is adjusted, the controller 330 may control the boost-up or boost-down of the converter included in the wireless power transmission apparatus.

When the gate voltage of the inverter included in the driver circuit 320 is adjusted, the controller 330 may control the gate voltage of the transistor to increase or decrease until the power transmission efficiency becomes maximum. For this, the wireless power transmission apparatus 300 may further include a bias controller although not shown in FIG. 3.

When receiving, from the wireless power reception apparatus, the power control signal including the difference value between the required power of the wireless power reception apparatus and the power received from the wireless power transmission apparatus during the wireless power transmission, i.e., while the power signal is being transmitted from the primary core 310, the controller 330 may control the output of the wireless power transmission apparatus 300 by controlling at least one of the DC voltage outputted from the converter and the gate voltage of the inverter in accordance with the difference value.

Figure 4:
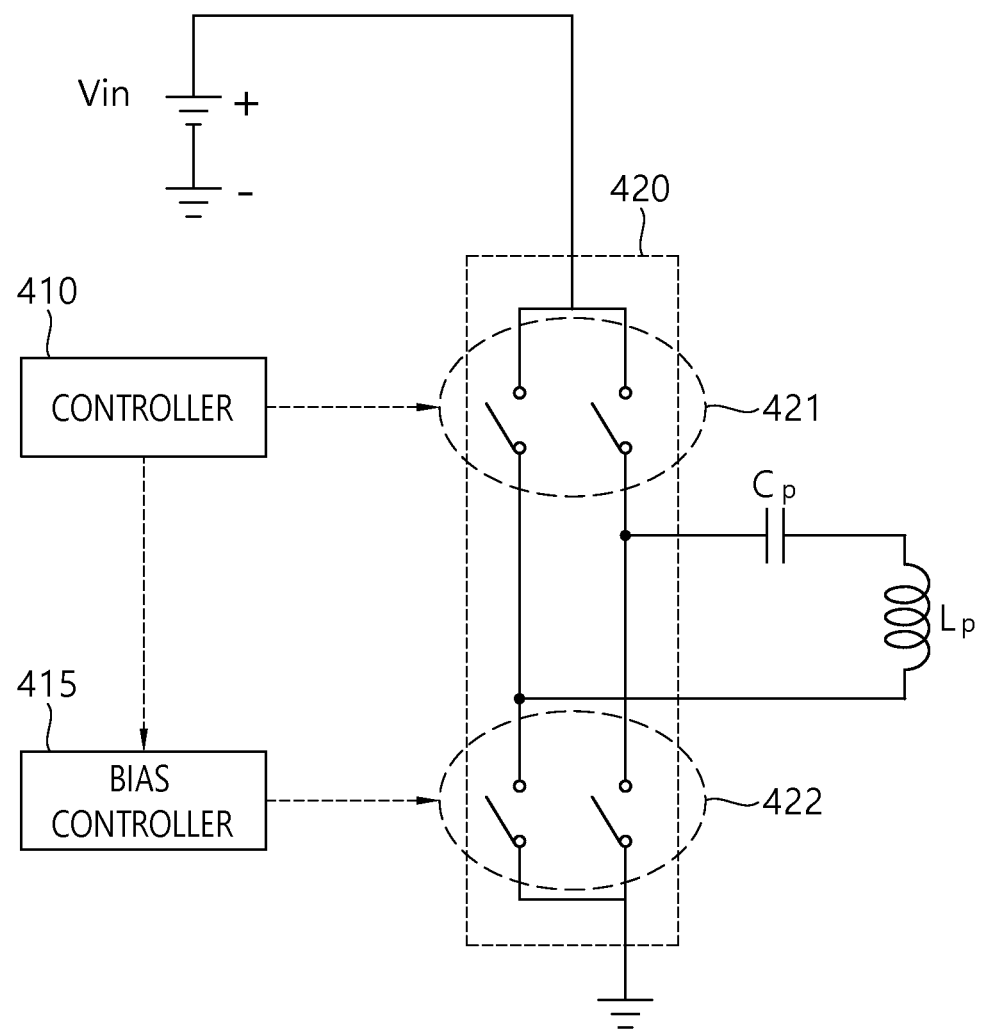
FIG. 4 is a circuit view illustrating a power transmission control method according to an embodiment of the present invention.

FIG. 4 is a circuit view illustrating a power transmission control method according to an embodiment of the present invention. FIG. 4 illustrates that the output and efficiency of the wireless power transmission apparatus are controlled by controlling the gate voltages of FETs 421 and 422 included in an inverter 420 without using a DC-DC converter.

When the controller 410 receives a power control signal requesting a power up (increase) from the wireless power reception apparatus, the controller 410 may increase the gate voltage(s) of the upper FET 421 and/or the lower FET 422 of the full bridge inverter 420 to increase the output of the wireless power transmission apparatus. On the contrary, when the controller 410 receives a power control signal requesting a power down (decrease) from the wireless power reception apparatus, the controller 410 may reduce the gate voltage(s)(gate bias) of the upper FET 421 and/or the lower FET 422 of the full bridge inverter 420 to reduce the output of the wireless power transmission apparatus.

On the other hand, even when the controller 410 receives a received power packet including the information about the power received at the wireless power reception apparatus from the wireless power reception apparatus, the controller 410 may control the output of the wireless power transmission apparatus to be maintained uniform and simultaneously the power transmission efficiency to be maintained at the maximum by controlling the upper 421 and/or the lower FET 422 of the full bridge inverter 420.

Although FIG. 4 shows a case where the controller 410 controls the lower FET 422 of the full bridge inverter 420 using a bias controller 415, the lower FET 422 of the full bridge inverter 420 may be directly controlled by the controller 410, and a half bridge inverter including two FETs may be used as an inverter instead of the full bridge inverter 420.

Figure 5:
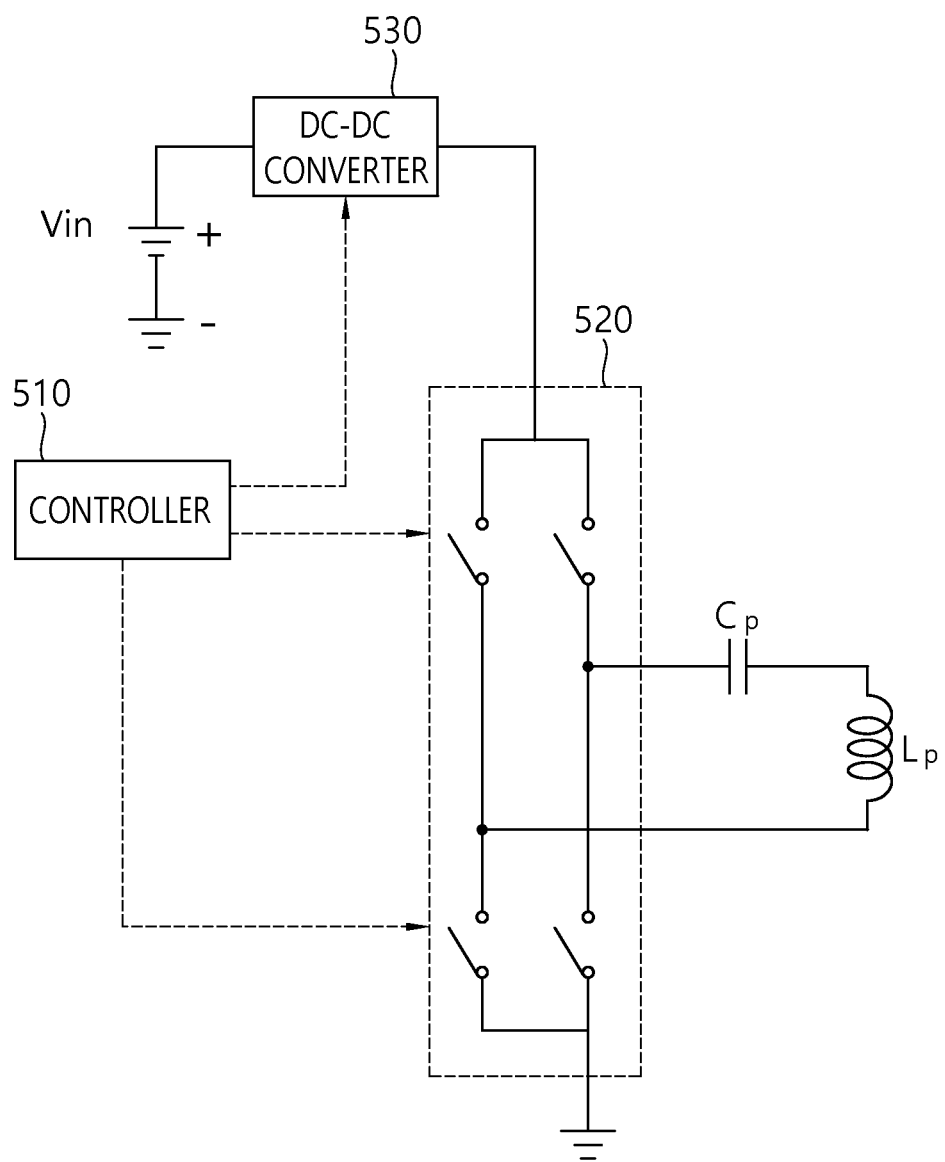
FIG. 5 is a circuit view for explaining a power transmission control method according to another embodiment of the present invention.

FIG. 5 is a circuit view for explaining a power transmission control method according to another embodiment of the present invention.

Referring to FIG. 5, a wireless power transmission apparatus according to another embodiment of the present invention may include a DC-DC converter 530. In this case, a controller 510 may control the DC-DC converter 530 or may boost up and/or down the DC-DC converter 530 without changing the output of the DC-DC converter 530 to improve the system efficiency. Also, similarly to the embodiment of FIG. 4, the controller 510 may control the gate voltage of an FET included in an inverter 520. Accordingly, the controller 510 can maintain the maximum efficiency even though the location of the wireless power reception apparatus changes during the wireless power transmission.

Figure 6:
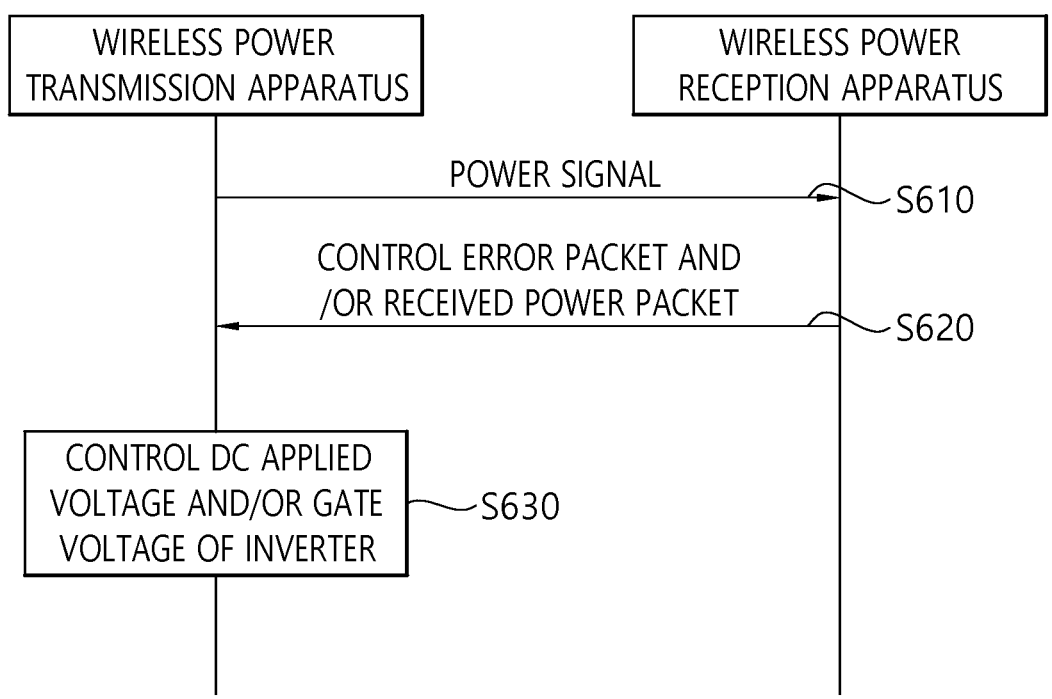
FIG. 6 is a flowchart illustrating a transmission power control method according to an embodiment of the present invention.

FIG. 6 is a flowchart illustrating a transmission power control method according to an embodiment of the present invention. Hereinafter, a method of controlling the transmission power by a wireless power transmission apparatus under the control of a wireless power reception apparatus will be described with reference to FIG. 6.

When a wireless power reception apparatus is detected, the wireless power transmission apparatus transmits a power signal to the wireless power reception apparatus using a primary coil included in the wireless power transmission apparatus (S610).

Thereafter, when receiving a control error packet including a difference value between power required in the wireless power reception apparatus and power received from the wireless power transmission apparatus during the wireless power transmission, that is, during charging (S620), the wireless power transmission apparatus may control at least one of a DC voltage applied to the wireless power transmission apparatus and a gate voltage of an inverter included in the wireless power transmission apparatus according to the difference value such that the power required by the wireless power reception apparatus can be transmitted (S630).

Meanwhile, when the wireless power transmission apparatus receives a received power packet from the wireless power reception apparatus during the wireless power transmission (S620), the wireless power transmission apparatus may calculate the power transmission efficiency based on information (reception power information) about the power received by the wireless power reception apparatus, which is included in the received power packet. Also, the wireless power transmission apparatus may adjust at least one of the DC voltage applied to the wireless power transmission apparatus and the gate voltage of the inverter to maintain the maximum power transmission efficiency. Here, the power transmission efficiency may be calculated based on the information about the power received by the wireless power reception apparatus and the input power of the wireless power transmission apparatus.

For example, when a received power packet is received, the wireless power transmission apparatus may compare the current power transmission efficiency with the power transmission efficiency calculated when the received power packet was previously received, and may compare the current transmission power with the transmission power calculated when the received power packet was previously received to control at least one of the DC voltage and the gate voltage such that the output of the wireless power transmission apparatus is maintained uniform while maintaining the maximum power transmission efficiency. This may be repeatedly performed until the current power transmission efficiency is reduced compared to the previous power transmission efficiency or the current transmission power differs from the previous transmission power.

Figure 7:
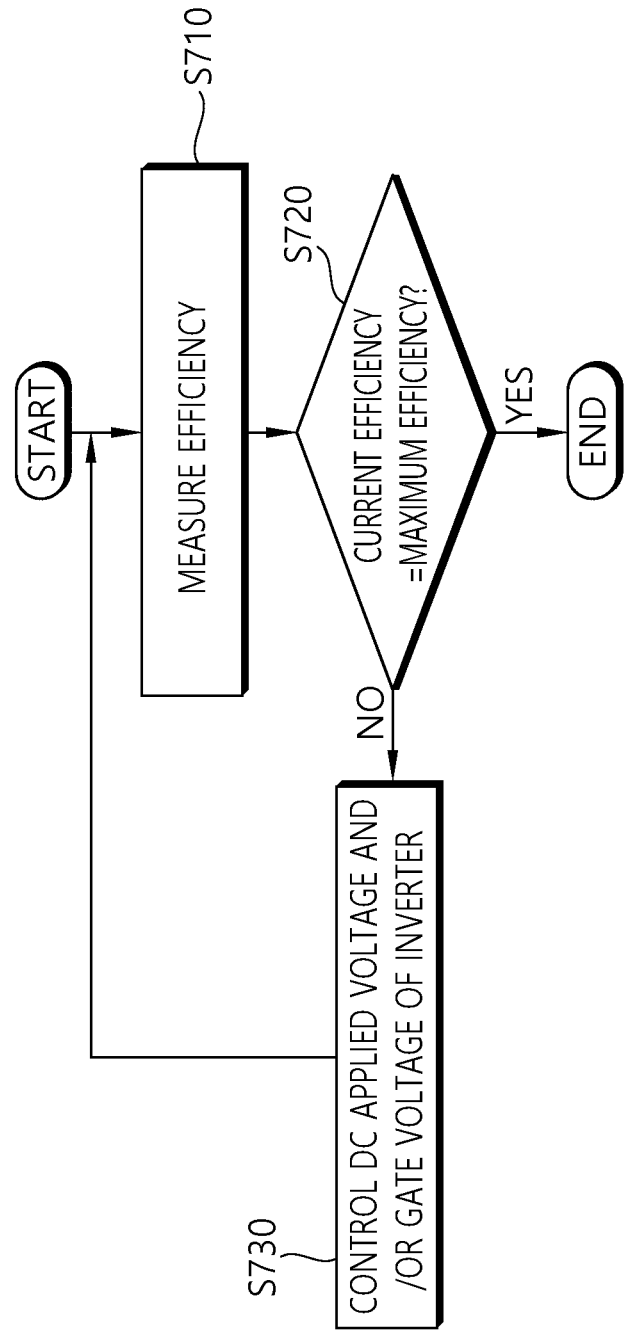
FIG. 7 is a flowchart illustrating a transmission power control method according to another embodiment of the present invention.

FIG. 7 is a flowchart illustrating a transmission power control method according to another embodiment of the present invention. Hereinafter, a method of maintaining the maximum system efficiency by controlling a DC applied voltage or adjusting a gate bias of the inverter even when the location of the wireless power reception apparatus changes during the wireless power transmission will be described with reference to FIG. 7.

If the wireless power transmission apparatus receives a received power packet including information about power received by the wireless power reception apparatus from the wireless power reception apparatus while transmitting a power signal to the wireless power reception apparatus using the primary coil included in the wireless power transmission apparatus, the wireless power transmission apparatus may control at least one of the DC voltage applied to the wireless power transmission apparatus and the gate voltage of the inverter included in the wireless power transmission apparatus based on the information about the power received by the wireless power reception apparatus.

For example, when the wireless power transmission apparatus receives a received power packet, the wireless power transmission apparatus may measure the power transmission efficiency based on information about the power received by the corresponding wireless power reception apparatus (S710), and may determine whether or not the current power transmission efficiency is maximum (S720). If the current power transmission efficiency is not the maximum efficiency, the wireless power transmission apparatus may control at least one of the DC voltage and the gate voltage so as to maintain the maximum power transmission efficiency (S730). Here, the power transmission efficiency may be calculated based on the information about the power received by the wireless power reception apparatus and the input power of the wireless power transmission apparatus.

For this, the wireless power transmission apparatus may compare the power transmission efficiency of the current cycle with the power transmission efficiency of the previous cycle, and may compare the transmission power of the current cycle with the transmission power of the previous cycle to control at least one of the DC voltage and the gate voltage such that the output of the wireless power transmission apparatus is maintained uniform while maintaining the maximum power transmission efficiency. This may be repeatedly performed until the power transmission efficiency of the current cycle is reduced compared to the power transmission efficiency of the previous cycle or the transmission power at the current cycle differs from the transmission power at the previous cycle. That is, whenever a received power packet is received, the wireless power transmission apparatus may measure the system efficiency to compare the system efficiency with a system efficiency value measured when a received power packet was previously received, and if the current measured value is smaller than the previous value, the wireless power transmission apparatus may control the DC voltage and/or the gate voltage such that the efficiency increases. Thus, when finding the maximum efficiency point, the wireless power transmission apparatus may control such that the maximum efficiency value is maintained.

Figure 8:
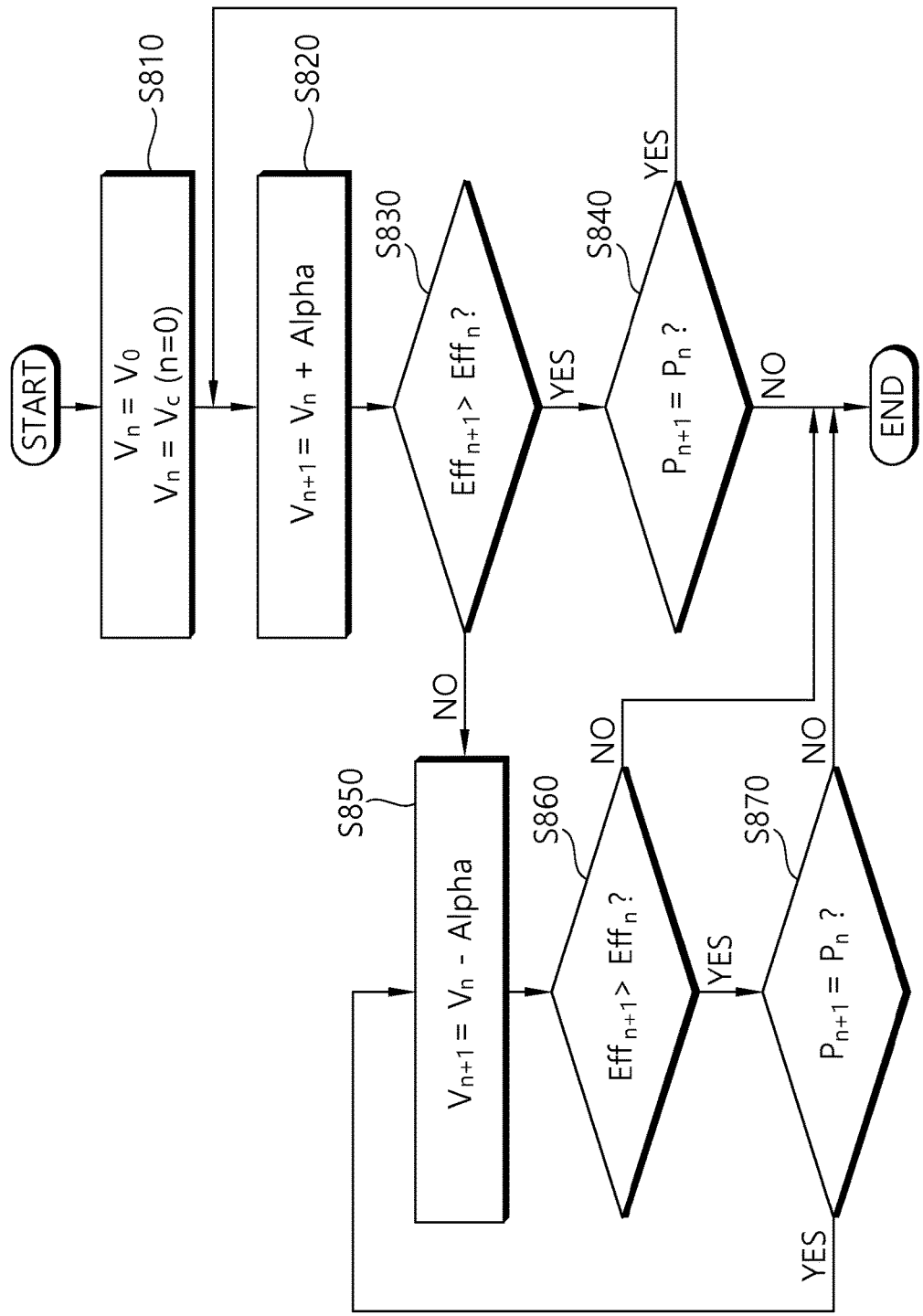
FIG. 8 is a flowchart illustrating a transmission power control method for maintaining a maximum of system efficiency according to another embodiment of the present invention.

FIG. 8 is a flowchart illustrating a transmission power control method for maintaining a maximum of system efficiency according to another embodiment of the present invention. Hereinafter, a method for maintaining the maximum system efficiency even if the location of the wireless power reception apparatus changes will be described in more detail.

In FIG. 8, $V_n$ represents a control voltage $V_c$ (system DC voltage or gate voltage of a FET) when an n-th received power packet is received, and $V_0$ represents a control voltage when n is '0', that is, when a control error packet or a received power packet is received from the wireless power reception apparatus for the first time.

At the beginning of operation of the wireless power transmission apparatus, $V_n$ is set to $V_0$, and $V_0$ is set to a control voltage $V_c$ when n is '0' (S810).

When receiving an (n+1)-th received power packet, the wireless power transmission apparatus adds a variable (Alpha; control variable) for control to the n-th control voltage value $V_n$ to generate an (n+1)-th control voltage value $V_{n+1}$ (S820). Here, the control variable may have a value of positive '+' or negative '−'. Also, it is determined whether or not the efficiency when the control variable has the (n+1)-th control voltage value $V_{n+1}$ increases more than when the control variable has the n-th control voltage value $V_n$ (S830).

If the efficiency increases when the control variable has the (n+1)-th control voltage value $V_{n+1}$, the wireless power transmission apparatus compares a system power when the control variable has the (n+1)-th control voltage value $V_{n+1}$ with a system power when the control variable has the n-th control voltage value $V_n$ (S840). If the (n+1)-th system power $P_{n+1}$ is different from the previous value $P_n$, the wireless power transmission apparatus stops the process of adding the control variable to the control voltage value. However, if the (n+1)-th system power $P_{n+1}$ is equal to the previous value $P_n$, the wireless power transmission apparatus repeats the process of adding the control variable Alpha to the control voltage and measuring the system efficiency.

During the repetition of the above process, if the system efficiency is not greater than the previous value, the wireless power transmission apparatus subtracts the control variable from the control voltage (S850), and compares the current system efficiency with the previous system efficiency (S860). If the comparison results in a decrease in efficiency, the wireless power transmission apparatus stops the process of subtracting the control variable from the control voltage value. Otherwise, the current system power is compared with the previous system power (S870). If the current system power is equal to the previous system power, the wireless power transmission apparatus repeats the process of subtracting the control variable from the control voltage value until the system power is changed, and if the system power is different from the previous system power, the wireless power transmission apparatus stops the process of subtracting the control variable from the control voltage value. Due to the above process, even though the location of the wireless power transmission apparatus according to an embodiment of the present invention changes with respect to the wireless power reception apparatus, the system output cannot be affected, and the system efficiency can be maintained at an optimum state.

The description above is merely illustrating the technical spirit of the present invention, and various changes and modifications may be made by those skilled in the art without departing from the essential characteristics of the present invention. Therefore, the embodiments disclosed in the present invention are intended to illustrate rather than limit the scope of the present invention, and the scope of the technical spirit of the present invention is not limited by these embodiments. The scope of the present invention should be construed by claims below, and all technical spirits within a range equivalent to claims should be construed as being included in the right scope of the present invention.

What is claimed is:

1. A wireless power transmission apparatus, comprising:
    a primary core comprising at least one primary coil configured to wirelessly transmit a power signal to a wireless power reception apparatus;
    a driver circuit configured to provide an Alternating Current (AC) voltage to the primary core;
    a measurement circuit configured to measure an AC current flowing from the driver circuit to the primary core; and
    a controller configured to:
        receive, from the wireless power reception apparatus, a control information that is indicative of a difference between a required power of the wireless power reception apparatus and the power signal received by the wireless power transmission apparatus;
        receive, from the wireless power reception apparatus, a received power packet including reception power information indicating the power signal received at the wireless power reception apparatus, the received power packet comprising an $n^{th}$ received power packet, wherein n comprises an index of the received power packet in a series of received power packets;
        calculate a power transmission efficiency of a previous control cycle based, at least in part, on the reception power information and the measured AC current flowing from the driver circuit to the primary core, wherein the previous control cycle comprises a first period between receipt of an $(n-1)^{th}$ received power packet and receipt of the $n^{th}$ received power packet in the series of received power packets; generate a control signal for a next control cycle based, at least in part, on the control information and the power transmission efficiency of the previous control cycle, wherein the next control cycle comprises a second period between the receipt of the $n^{th}$ received power packet and receipt of an $(n+1)^{th}$ received power packet in the series of received power packets; and
        provide the control signal to the driver circuit to control the AC current flowing from the driver circuit to the primary core during the next control cycle.

2. The wireless power transmission apparatus of claim 1, wherein the controller is further configured to determine whether the power transmission efficiency of the previous control cycle is below a maximum efficiency, and wherein the controller is further configured adjust the control signal based on a determination that the power transmission efficiency of the previous control cycle is below the maximum efficiency.

3. The wireless power transmission apparatus of claim 1, wherein the driver circuit includes an inverter configured to provide an AC voltage to the primary core for use in transmission of the power signal to the wireless power reception apparatus; and wherein the control signal provided by the controller controls a direct current (DC) voltage of power supplied to the inverter used in forming the power signal.

4. The wireless power transmission apparatus of claim 3, wherein the inverter is a half bridge inverter or a full bridge inverter comprising at least two transistors.

5. The wireless power transmission apparatus of claim 4, wherein the at least two transistors include an N-Channel or P-channel Metal Oxide Silicon Field Effect Transistor (MOSFET).

6. The wireless power transmission apparatus of claim 4, wherein the controller controls a gate voltage of the at least two transistors to generate the power signal.

7. The wireless power transmission apparatus of claim 1, wherein receipt of the received power packet including the reception power information occurs while the power signal is being transmitted by the primary core.

8. A method of controlling power transmission by a wireless power transmission apparatus, the method comprising:
transmitting, via a primary core, a power signal to a wireless power reception providing, via a driver circuit, the AC voltage to the primary core;
apparatus using an Alternating Current (AC) voltage;
measuring an AC current flowing from the driver circuit to the primary core;
receiving control information from the wireless power reception apparatus in a control error packet, the control error packet including control information being indicative of a difference between a required power of the wireless power reception apparatus and the power signal received by the wireless power transmission apparatus, the control error packet comprising an $n^{th}$ control error packet, wherein n comprises an index of the control error packet in a series of control error power packets;
receiving, from the wireless power reception apparatus, reception power information indicating the power signal received at the wireless power reception apparatus;
calculating a power transmission efficiency of a previous control cycle based, at least in part, on the reception power information and the measured AC current flowing from the driver circuit to the primary core, wherein the previous control cycle comprises a period between receipt of an $(n-1)^{th}$ control error packet and receipt of the nth control error packet in the series of control error packets;
generating, by a controller, a control signal for a next control cycle based, at least in part, on the control information and the power transmission efficiency of the previous control cycle wherein the next control cycle comprises a second period between the receipt of the nth control error packet and receipt of an $(n+1)^{th}$ control error packet; and
providing the control signal from the controller to the driver circuit to control the AC current flowing from the driver circuit to the primary core during the next control cycle.

9. The method of claim 8, further comprising:
determining whether the power transmission efficiency is below a maximum efficiency; and
adjusting the control signal based on a determination that the power transmission efficiency of the previous control cycle is below the maximum efficiency.

10. The method of claim 8,
wherein the driver circuit includes an inverter configured to provide the AC voltage to the primary core for use in transmission of the power signal to the wireless power reception apparatus; and
wherein the control signal generated by the controller controls a direct current (DC) voltage of power supplied to the inverter.

11. A wireless power transmission apparatus, comprising:
a primary core comprising at least one primary coil configured to wirelessly transmit a power signal to a wireless power reception apparatus;
a driver circuit configured to provide an Alternating Current (AC) voltage to the primary core;
a measurement circuit configured to measure a current flowing from the driver circuit to the primary core; and
a controller configured to:
calculate a power transmission efficiency of a previous control cycle based, at least in part, on reception of a received power packet including power information from the wireless power reception apparatus and the measured current flowing from the driver circuit to the primary core, wherein the previous control cycle comprises a period between receipt of an $(n-1)^{th}$ received power packet and receipt of an $n^{th}$ received power packet in a series of received power packets, wherein n comprises an index of the received power packet in the series of power packets, and
generate and provide a control signal to the driver circuit to control the current flowing from the driver circuit to the primary core during a next control cycle based, at least in part, on the power transmission efficiency of the previous control cycle, wherein the next control cycle comprises a second period between the receipt of the $n^{th}$ received power packet and receipt of an $(n+1)^{th}$ received power packet in the series of received power packets.

12. The wireless power transmission apparatus of claim 11, wherein the controller is further configured to:
adjust, using the control signal, a parameter of the driver circuit to increase or decrease the current flowing from the driver circuit to the primary core for the next control cycle until the power transmission efficiency of the previous control cycle becomes a maximum efficiency.

13. The wireless power transmission apparatus of claim 12, wherein the controller is further configured to:
receive, from the wireless power reception apparatus, control information requesting an adjustment to the power signal; and
generate the control signal such that the power transmission efficiency for the next control cycle is maintained at the maximum efficiency while adjusting the power signal for the next control cycle.

14. The wireless power transmission apparatus of claim 12, wherein the controller is further configured to:
repeatedly adjust the control signal for each of a plurality of control cycles until the power transmission efficiency is the maximum efficiency.

* * * * *